(12) United States Patent
Johnson et al.

(10) Patent No.: US 9,288,035 B2
(45) Date of Patent: Mar. 15, 2016

(54) SYSTEMS AND METHODS FOR A COMMUNICATIONS TRANSFER BETWEEN INTERNET PROTOCOL MULTIMEDIA SERVICES AND PUSH TO TALK SERVICES

(71) Applicant: HARRIS CORPORATION, Melbourne, FL (US)

(72) Inventors: Reid H. Johnson, Portsmouth, NH (US); Shawn D. Lefebre, Windham, NJ (US)

(73) Assignee: Harris Corporation, Melbourne, FL (US)

( * ) Notice: Subject to any disclaimer, the term of this patent is extended or adjusted under 35 U.S.C. 154(b) by 193 days.

(21) Appl. No.: 14/183,020

(22) Filed: Feb. 18, 2014

(65) Prior Publication Data
US 2015/0236843 A1  Aug. 20, 2015

(51) Int. Cl.
*H04L 5/16* (2006.01)
*H04W 4/10* (2009.01)

(52) U.S. Cl.
CPC .. *H04L 5/16* (2013.01); *H04W 4/10* (2013.01)

(58) Field of Classification Search
CPC ........... H04L 65/1016; H04L 65/4061; H04M 3/533; H04M 7/006; H04W 88/184; H04W 76/022; H04W 4/14; H04W 88/06; H04W 4/06; H04W 76/045; H04W 76/025
See application file for complete search history.

(56) References Cited

U.S. PATENT DOCUMENTS

| | | | | |
|---|---|---|---|---|
| 2005/0220079 A1* | 10/2005 | Asokan | ............... | H04W 76/025 370/352 |
| 2006/0046757 A1* | 3/2006 | Hoover | ................. | H04M 2/533 455/518 |
| 2006/0172754 A1* | 8/2006 | Shin | ........................ | H04W 4/10 455/518 |
| 2006/0229093 A1* | 10/2006 | Bhutiani | .................. | H04W 4/10 455/518 |
| 2009/0005100 A1* | 1/2009 | Copeland | ............ | H04L 65/4038 455/518 |
| 2009/0325561 A1* | 12/2009 | Xu | .......................... | H04W 4/16 455/416 |
| 2014/0112244 A1* | 4/2014 | Lindner | .............. | H04L 65/4061 370/328 |

FOREIGN PATENT DOCUMENTS

| | | |
|---|---|---|
| EP | 1650998 A1 | 4/2006 |
| EP | 1774679 A1 | 4/2007 |
| EP | 2001213 | 12/2008 |
| WO | 2006/105275 | 10/2006 |

OTHER PUBLICATIONS

European Search Report issued Jul. 20, 2015 for European Patent Application No. 15000436.4 (4 pages).

* cited by examiner

*Primary Examiner* — Jung-Jen Liu
(74) *Attorney, Agent, or Firm* — Fox Rothschild, LLP; Robert J. Sacco; Carol E. Thorstad-Forsyth

(57) ABSTRACT

Systems (200) and methods for a full-duplex call transfer into a half-duplex call. The methods involve: establishing the first full-duplex call between a first communication device (214) and a second communication device (204) already engaged in the half-duplex call with at least one third communication device (206, 208); and communicating a REFER request message (306) from the second communication device to the first communication device. The REFER request message includes contact information for redirecting the first communication device to a hybrid application server and token information useful for patching the full-duplex call into the half-duplex call. In response to the REFER request message, the second communication device performs operations to terminate the first full-duplex call and establish a second full-duplex call with the hybrid application server. Thereafter, the hybrid application server performs operations to patch the second full-duplex call into the half-duplex call using the token information.

36 Claims, 7 Drawing Sheets

SYSTEMS AND METHODS FOR A COMMUNICATIONS TRANSFER BETWEEN INTERNET PROTOCOL MULTIMEDIA SERVICES AND PUSH TO TALK SERVICES

BACKGROUND OF THE INVENTION

1. Statement of the Technical Field

The inventive arrangements relate to communication systems and methods for call transfer. More particularly, the invention concerns systems and methods for patching full duplex calls into half-duplex calls.

2. Description of the Related Art

The Federal Communications Commission ("FCC") has reserved twenty Mega Hertz of spectrum exclusively for the use of public safety in the United States. In this regard, the FCC set up a FirstNet Board to manage that spectrum and build out of the network that will be using that spectrum. The network employs a Long Term Evolution ("LTE") technology for wireless communication of high-speed data between mobile devices. The LTE technology is well known in the art, and therefore will not be described in detail herein. However, it should be understood that the LTE technology supports packet switching within an Internet Protocol ("IP") network.

The FirstNet Board has indicated a strong desire to enable end user services using all standards based solutions. The standards based solutions include, but are not limited to, an IP Multimedia Subsystem ("IMS") based standard solution created by the 3$^{rd}$ Generation Partnership Project ("3GPP"). IMS is an architectural framework for delivering IP multimedia services, and therefore comprises a core network for a variety of standardized application layer services. The standardized application layer services include, but are not limited to, telephony services and group Push-To-Talk ("PTT") services.

One such telephony service is referred to in the art as a Voice over LTE ("VoLTE") service. The VoLTE service is an approach based on the IMS architectural framework, with specific profiles for control and media planes of voice services on LTE defined by the GSM Association ("GSMA"). In this regard, the VoLTE service allows users to establish person-to-person voice calls and video chats over an LTE core network using their cellular phones. Notably, these cellular phones need to have software loaded thereon to provide the VoLTE functionality. This functionality would typically be integrated with the cellular phones according to the requirements of a service provider prior to the cellular phones being sold to users.

The PTT service has been standardized by the Open Mobile Alliance ("OMA"). The PTT service could be provided by an app or in an integrated solution according to the requirements of the service provider. The PTT service provides a way to have conversations on half-duplex communication lines, including two-way radio, using a single button to switch between transmit mode and receive mode. The PTT service for a cellular phone network is known in the art as Push to Talk over Cellular ("PoC"). PoC is a service option for the cellular phone network which permits subscribers to use their phone as a walkie-talkie with a range limited to the coverage area of the cellular network. A significant advantage of the PoC is the ability for a single user to reach many users on an active talk group with a single button press. The user need not make several telephone calls to coordinate with the members of the active talk group.

Notably, the VoLTE service and the PTT service are two separate services. Accordingly during operation of a communications device, a user can be concurrently engaged in a VoLTE person-to-person voice call and a PTT group call. For example, a first responder is engaged in a telephony call with a subject matter expert about hazardous material because a tanker has overturned on a highway, while concurrently being engaged in a PTT group call with all other first responders. The subject matter expert may have information that is pertinent to the entire group of first responders. Therefore, it is beneficial to have the subject matter expert convey such information directly to all of the first responders, rather than just one first responder. However, in some scenarios, the communications device of the subject matter expert may not have (1) the PTT group call functionality, (2) the group privileges, and/or (3) the required Quality of Service ("QoS"). Various solutions exist for addressing these scenarios such that the pertinent information can be conveyed from the expert to all of the first responders despite the absence of (1)-(3). All of these existing solutions are cumbersome and time consuming non-broadband solutions because they require: (a) a manual termination of the VoLTE call between the first responder and expert; and (b) a manual establishment of a new call between the expert and the first responder group. The new call is manually established by the expert using the user interface of the respective communication device. In this regard, the expert dials a new phone number and enters a talkgroup identifier when prompted. Once can appreciate that these existing solutions are undesirable in emergency situations where time if of the essence.

SUMMARY OF THE INVENTION

The present invention concerns systems and methods for a full-duplex call transfer into a half-duplex call. The methods involve: establishing the first full-duplex call between a first communication device and a second communication device which is already engaged in the half-duplex call with at least one third communication device; and communicating a REFER request message from the second communication device to the first communication device. The REFER request message includes a Refer-to header field with contact information for redirecting the first communication device to a hybrid application server and a Refer-to token field with token information useful for patching the full-duplex call into the half-duplex call. The token information comprises at least one of an identifier of the second communication device, authentication information for a user of the second communication device, a time stamp indicating a time the call transfer began, a location of the hybrid application server on a half-duplex network, and a talkgroup identifier. Also, the token information may be safeguarded using integrity and security mechanisms (e.g., it may be encrypted and/or digitally signed).

In response to the REFER request message, the second communication device performs operations to terminate the first full-duplex call and establish a second full-duplex call with the hybrid application server. These operations can include communicating an INVITE message to the hybrid application server including the contact information and the token information without any modifications.

Subsequently, the hybrid application server performs operations to patch the second full-duplex call into the half-duplex call using the token information. In this regard, the hybrid application sever performs operations to convert a telephony protocol format of first data received from the first communication device to a PTT protocol format. The first data in the PTT protocol format is then sent from the hybrid application server to the second communication device (e.g., via a PTT group communication) and/or a plurality of communication devices of a particular talk group. Similarly, the hybrid application sever performs operations to convert a PTT protocol format of second data received from the second communication device (or any other device of the particular talk group) to a telephony protocol format. The second data in the telephony protocol format is then sent from the hybrid application server to the first communication device.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
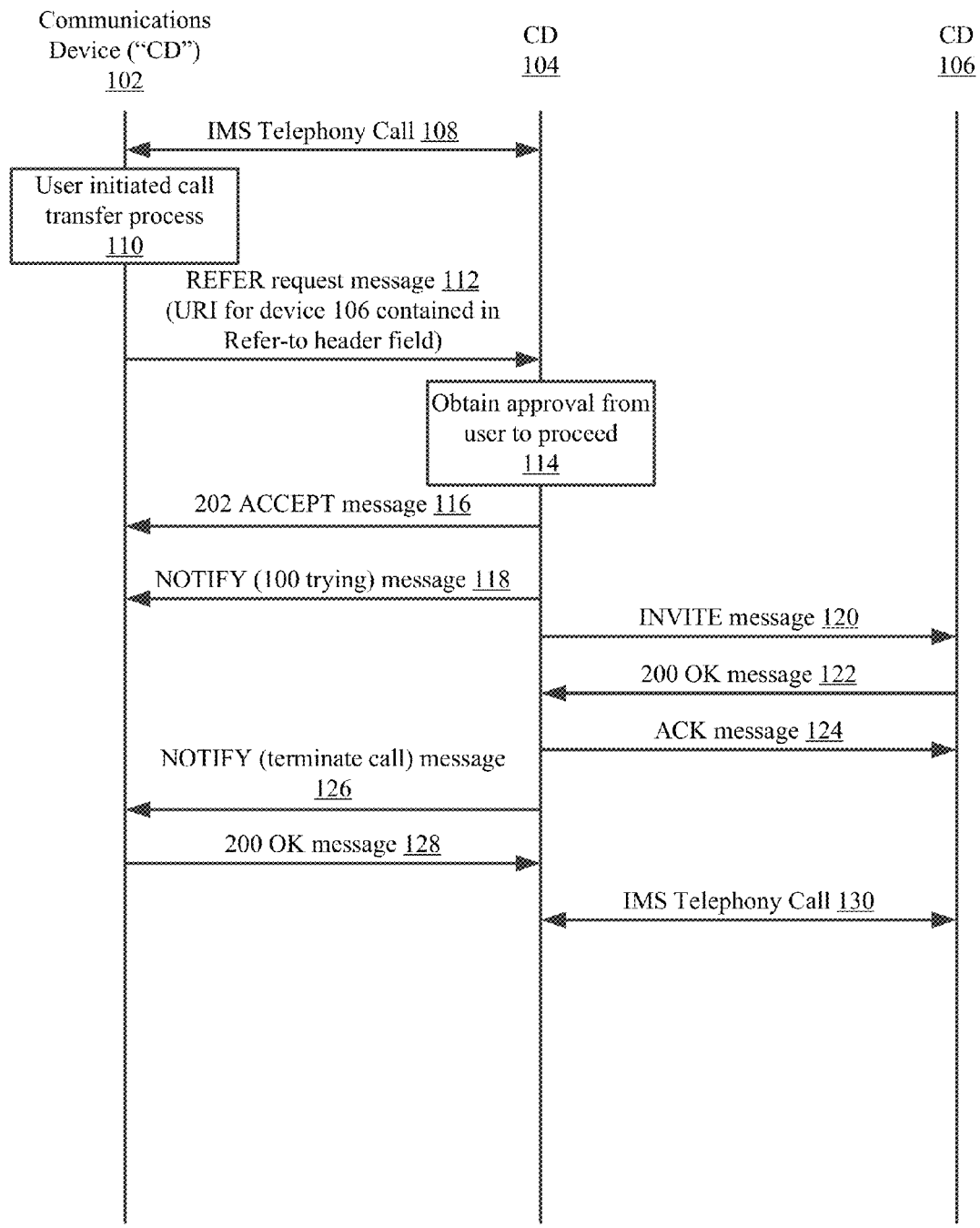
FIG. 1 is a schematic illustration that is useful for understanding a conventional Session Initiation Protocol ("SIP") REFER method.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The Internet Engineering Task Force ("IETF") publishes a document known as the Request For Comments ("RFC"). The RFC is a publication of the principle technical development and standards-setting bodies for the Internet. RFC 3515 discloses an extension to SIP that defines an SIP REFER method to enable call transfer applications. The 3GPP discloses how to use the IETF standards and protocols to perform certain actions. For example, 3GPP Technical Specification ("TS") 22.173 specifies the IMS Multimedia Telephone Service ("MTS") and related supplemental services, which is the next generation of telephony calling. Current telephony calling services are circuit switched services. In contrast, the next generation telephony calling services are packet based services. One such supplemental service includes an Explicit Communications Transfer ("ECT") supplementary service. The ECT supplementary service enables the transfer of a communicating party to a third party using the SIP REFER method. The SIP REFER method of the ECT supplementary service is conventionally used in a telephony only situation where a telephony caller would be transferred to another telephony caller.

A schematic illustration of the conventional SIP REFER method is provided in FIG. 1. As shown in FIG. 1, two Communication Devices ("CDs") 102 and 104 are engaged in an IMS telephony call 108. During the IMS telephony call 108, CD 102 initiates the conventional SIP REFER method for transferring the IMS telephony caller of CD 104 to another CD 106. The conventional SIP REFER method involves communicating a REFER request message 112 from CD 102 to CD 104. The REFER request message 112 comprises a Uniform Resource Identifier ("URI") for CD 106 in the Refer-to header field thereof. The REFER request message 112 is then received by CD 104. At CD 104, approval from the user of CD 104 is obtained for proceeding with the call transfer, as shown by functional block 114. In response to the user's approval, CD 104 communicates a 202 ACCEPT message 116 and a NOTIFY (100 trying) message 118 to CD 102. Thereafter, CD 104 sends an INVITE message 120 to CD 106. In turn, CD 106 sends a 200 OK message 122 to CD 104. CD 104 then sends an ACK message 124 to CD 106 and a NOTIFY (terminate call) 126 to CD 102. Once a 200 OK message 128 sent from CD 102 has been received by CD 104, CD 104 engages in an IMS telephony call 130 with CD 106.

The present invention uses the ECT supplementary service (more particularly, the SIP REFER method) in a non-conventional and novel way to transfer an IMS based telephony call to a Hybrid Application Service ("HAS"). The HAS is generally capable of patching a telephony call through to an IMS based PTT Application Server ("AS"). In this regard, the HAS maintains the telephony call with the communication device of a telephony caller, and then transfers that telephony call into a PTT call. The manner in which this transference is achieved will be described in more detail below. Notably, the present invention can be used in any Voice over Internet Protocol ("VoIP") solution which is compliant with IMS ECT. Also, the standardized OMA PoC service is not a requirement of the present invention. Any PTT solution could be interfaced with the HAS.

Figure 2:
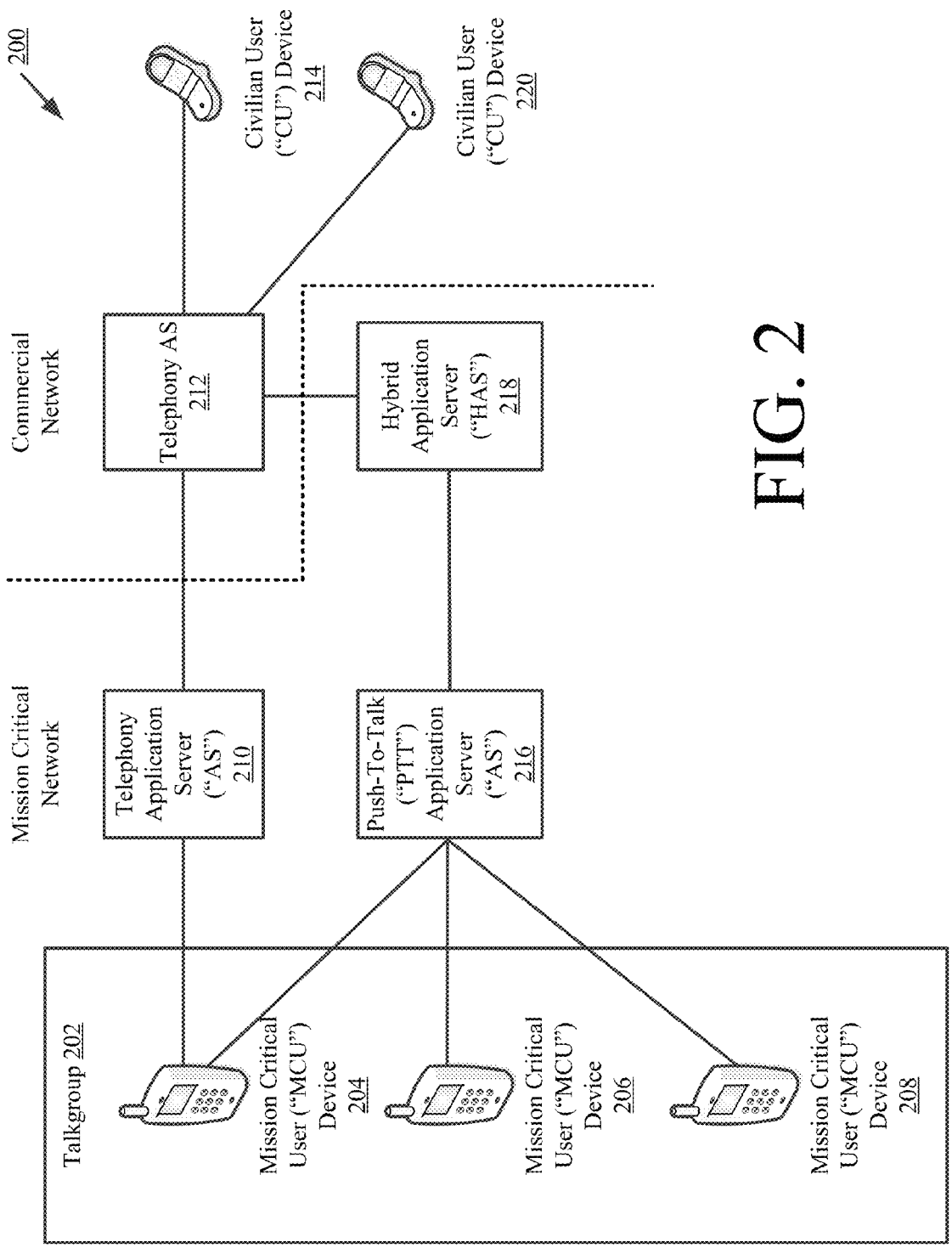
FIG. 2 is a block diagram of an exemplary IMS based system that is useful for understanding the present invention.

Referring now to FIG. 2, there is provided a schematic illustration of an exemplary IMS based system 200 that is useful for understanding the present invention. The system 200 is generally configured to allow patching of a full-duplex call into a half-duplex call. In this regard, system 200 comprises a plurality of user devices 204-208, 214 and a plurality of application servers 210, 212, 216, 218. The user devices 204-208 comprise Mission Critical User ("MCU") devices which are part of a talkgroup 202. As such, the MCU devices 204-208 are able to be engaged in an IMS PTT call with each other. The present invention is not limited to IMS PTT calls. As such, in some scenarios, non-IMS PTT calls can be employed (e.g., proprietary PTT calls). Still, the present invention will be described as employing IMS PTT calls for purposes of simplicity and ease of explanation. IMS PTT calls are well known in the art, and therefore will not be described in detail herein. However, it should be understood that, during an IMS PTT call, a member of the talkgroup 202 talks to and listens to other members of the talk group on a half-duplex communication line. The talkgroup member switches a mode of the MCU device 204, 206, or 208 between a voice transmit mode to a voice receive mode using a momentary PTT button. A PTT AS 216 facilitates the IMS PTT call. PTT ASs are well known in the art, and therefore will not be described in detail herein.

As shown in FIG. 1, MCU device 204 is also able to be engaged in an IMS telephony call with Civilian User ("CU") device 214. In this regard, the MCU device 204 is communicatively coupled to the CU device 214 via telephony ASs 210 and 212. Telephony ASs are well known in the art, and therefore will not be described in detail herein. Still, it should be understood that the telephony AS s facilitate the IMS telephony call between MCU device 204 and CU device 214. Notably, MCU device 204 and CU device 214 have interconnects to a Hybrid Application Server ("HAS") 218 via the telephony ASs 210 and 212. The present invention is not limited to the architecture shown in FIG. 2. For example, in some scenarios, MCU 204 is not communicatively coupled to HAS 218. Also, one or more of the connections between components 204-220 can be direct or indirect connects as understood by persons skilled in the art.

Figure 3:
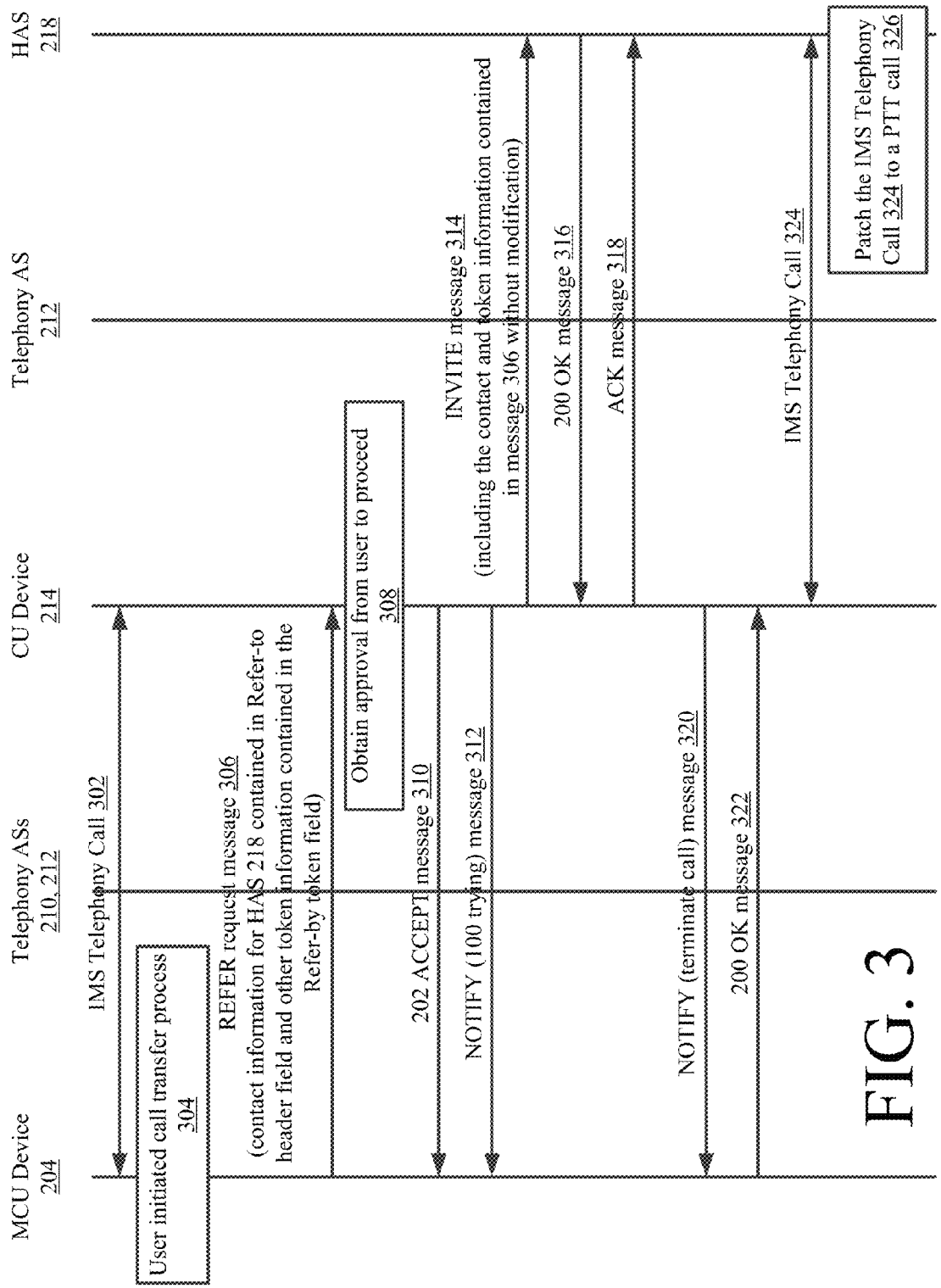
FIG. 3 is a schematic illustration of an exemplary mission critical user device shown in FIG. 1 that is useful for understanding the present invention.

During the IMS telephony call, MCU device 204 can redirect CU device 214 to the HAS 218 using the ECT supplementary service. In this regard, the redirecting is achieved using the SIP REFER method for referring the CU device 214 to the network address of the HAS 218. A schematic illustration that is useful for understanding the SIP REFER method employed by system 200 is provided in FIG. 3. As shown in FIG. 3, the SIP REFER method involves: initiating the SIP REFER method in response to the reception of instructions from the user of MCD device 204, as shown by functional block 304. In some scenarios, the modified SIP REFER method is initiated by the user of the MCU device 204 via a mechanical button, a virtual button and/or a menu item of a Graphical User Interface ("GUI") displayed on a display screen of the MCU device 204. Thereafter, a REFER request message 306 is sent from MCU device 204 to CU device 214 via Telephony ASs 210, 212. The REFER request message 306 indicates that the CU device 214 should contact the HAS 218 using the contact information provided in the REFER request message (e.g., a URI contained in a Refer-to header field of the REFER request message 306). The REFER request message 306 may also include other token information necessary for patching the IMS telephony call 302 into a PTT call. The token information may be contained in the Refer-by token field of the REFER request message 306. The token information includes, but is not limited to, an identifier of MCU device 204, authentication information for a user of MCU device 204, a time stamp indicating the time the SIP REFER method started, a location of HAS 218 on a PTT network, and/or a talkgroup identifier. In some scenarios, the contact information and token information are encrypted and signed.

In response to the reception of the REFER request message 306, CU device 214 obtains approval from the user thereof to proceed, as shown by functional block 308. This approval can be satisfied with an interactive query. After obtaining the user's approval to proceed, CU device 214 performs actions to establish communications with the HAS 218, terminate the IMS telephony call with MCU device 204, and engage in an IMS telephony call with HAS 218. In this regard, CU device 214 communicates a 202 ACCEPT message 310 and a NOTIFY (100 trying) message 312 to MCU device 204 via telephony ASs 210, 212. CU device 214 also sends an INVITE message 314 to HAS 218. The INVITE message 314 includes the contact and token information necessary for patching the IMS telephony call 302 into a PTT call. The contents of the contact and token information will become evident as the discussion progresses. The contact and token information includes, but is not limited to, the contact and token information contained in the REFER request message 306 without modification. As such, the INVITE message 314 comprises contact information for HAS 218, an identifier of MCU device 204, authentication information for a user of MCU device 204, a time stamp indicating the time the SIP REFER method started, a location of HAS 218 on a PTT network, and/or a talkgroup identifier.

In response to the INVITE message 314, CU device 214 and HAS 218 exchange a 200 OK message 316 and an ACK message 318, as shown in FIG. 3. These messages 316, 318 establish an IMS telephone communications link between devices 214 and 218. Subsequently, the IMS telephony call communications link between MCD device 204 and CU device 214 is terminated by the exchange of a NOTIFY (terminate call) message 320 and a 200 OK message 322 therebetween. After the IMS telephony call communications link is terminated between devices 204 and 214, devices 212 and 218 engage in an IMS telephony call 324 by which media is exchanged therebetween.

As noted above the ECT supplementary service (and more particularly the SIP REFER method) is conventionally used to redirect a call from CU device 214 to another CU device 220, and not to an HAS 218 as described herein for purposes of enabling the patching of the IMS telephony call to the IMS PTT call. Therefore, the use of the ECT supplementary service (and more particularly the SIP REFER method) as described herein is a novel approach for enabling the patching of a full-duplex call into a half-duplex call, without requiring the CU device 214 to be PTT network compatible.

Notably, the contact and token information contained in the INVITE message 314 provides the HAS 118 with enough information to patch the IMS call into the IMS PTT call. In this regard, it should be appreciated that the token information contained in the INVITE message 314 specifies to which talkgroup the CU device 114 should be connected. Accordingly, HAS 218 uses the token information contained in the INVITE message 314 to patch the IMS telephony call 324 to a PTT call 326. A schematic illustration of the patching process is provided in FIG. 4.

Figure 4:
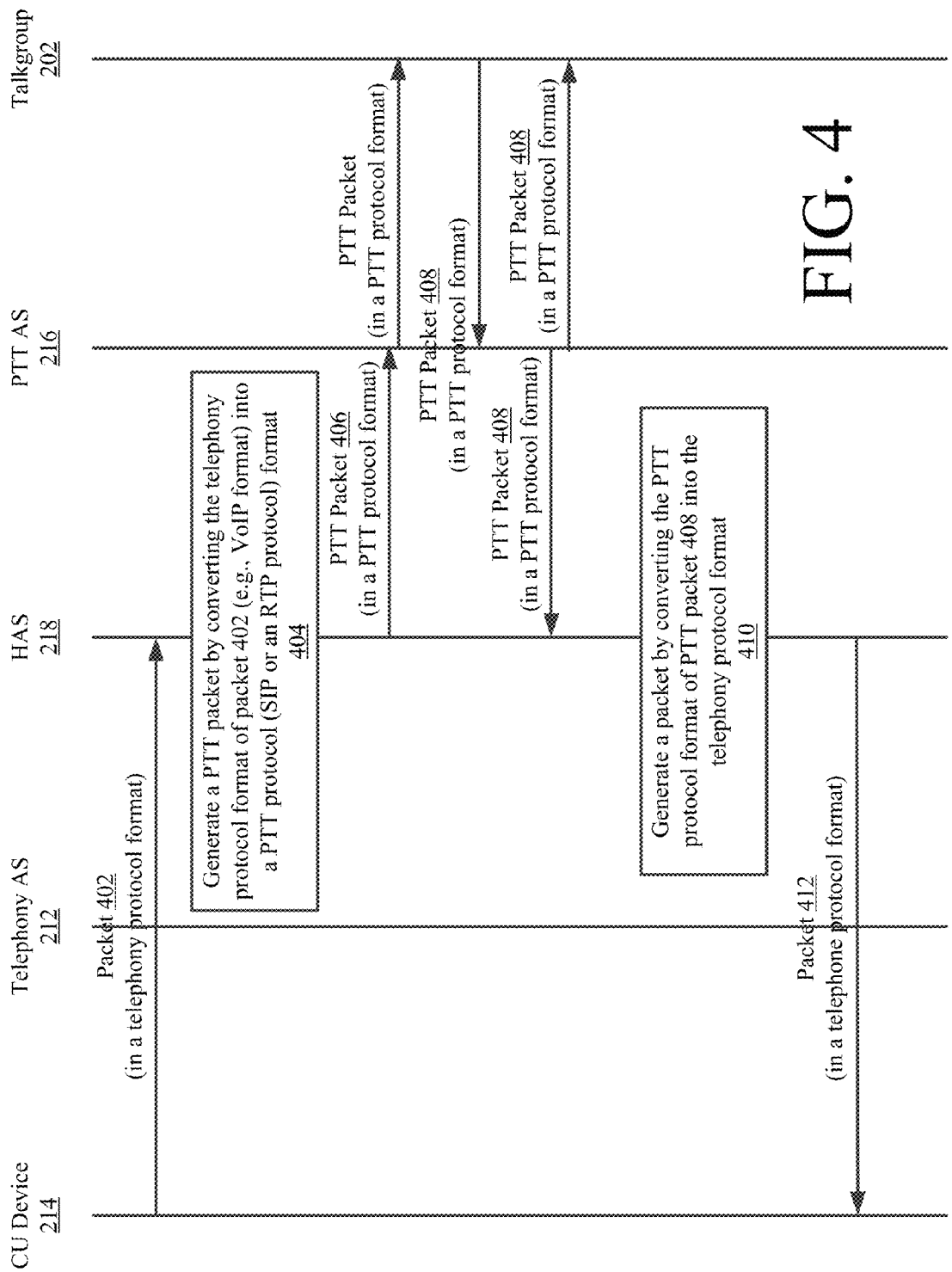
FIG. 4 is a schematic illustration of an exemplary process for patching a full duplex call to a half-duplex call in accordance with the present invention.
Figure 5:
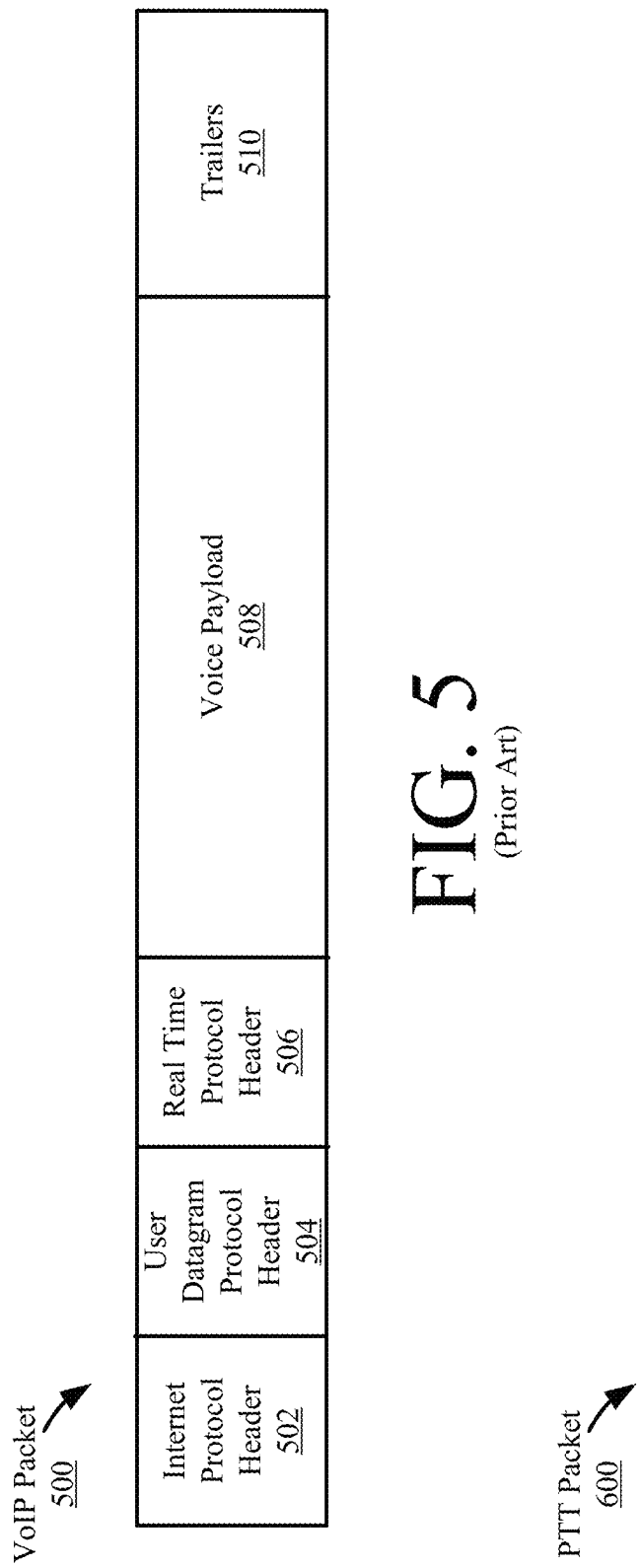
FIG. 5 is a schematic illustration of an exemplary telephony packet that is useful for understanding the present invention.

Referring now to FIG. 4, the patching process involves sending a packet 402 from CU device 214 to HAS 210 via telephony AS 212. Packet 402 is in a telephony protocol format. Telephony protocol formats are well known in the art, and therefore will not be described herein. Still, it should be understood that the telephony protocol format can include, but is not limited to, a VoIP format. An example of a VoIP packet is provided in FIG. 5. As shown in FIG. 5, the VoIP packet 500 comprises an IP header 502, a User Datagram Protocol ("UDP") header 504, a Real Time Protocol ("RTP") header 506, a voice payload 508 and trailers 510. Each component 502-510 is well known in the art, and therefore will not be described herein.

Figure 6:
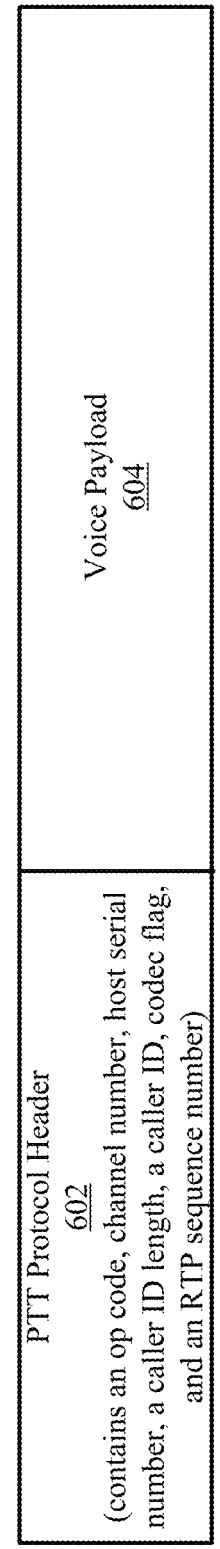
FIG. 6 is a schematic illustration of an exemplary PTT packet that is useful for understanding the present invention.

At HAS 210, the packet 402 is processed so as to generate a PTT packet 406. In this regard, HAS 210 performs operations to convert the telephony protocol format of packet 402 into a PTT protocol format. PTT protocol formats are well known in the art, and therefore will not be described herein. Still, it should be understood that the PTT protocol format can include, but is not limited to, an SIP format. An example of a PTT packet is provided in FIG. 6. As shown in FIG. 6, the PTT packet 600 comprises a PTT protocol header 602 and a voice payload 604. The PTT protocol header 602 can include, but is not limited to, an op code, a channel number, a host serial number, a caller ID length, a caller identifier, codec, flags, and/or an RTP sequence number. Each of the listed content of the PTT protocol header is well known in the art, and therefore will not be described herein.

The PTT packet 406 is then communicated from HAS 210 to the talkgroup 202 via PTT AS 216. At some time later, one of the MCU devices of the talkgroup 202 (e.g., MCU device 204 of FIG. 2) generates another PTT packet 408. The PTT packet 408 is then sent from the MCU device to the PTT AS 216. PTT AS 216 forwards the PTT packet 408 to the other members of the talkgroup 202, as well as to the HAS 218. At the HAS 218, the PTT packet 408 is processed to convert its PTT protocol format into a telephony protocol format, as shown by functional block 410. The resulting packet 412 is then sent from HAS 218 to CU device 214 via the IMS telephony communications link established therebetween.

Figure 7:
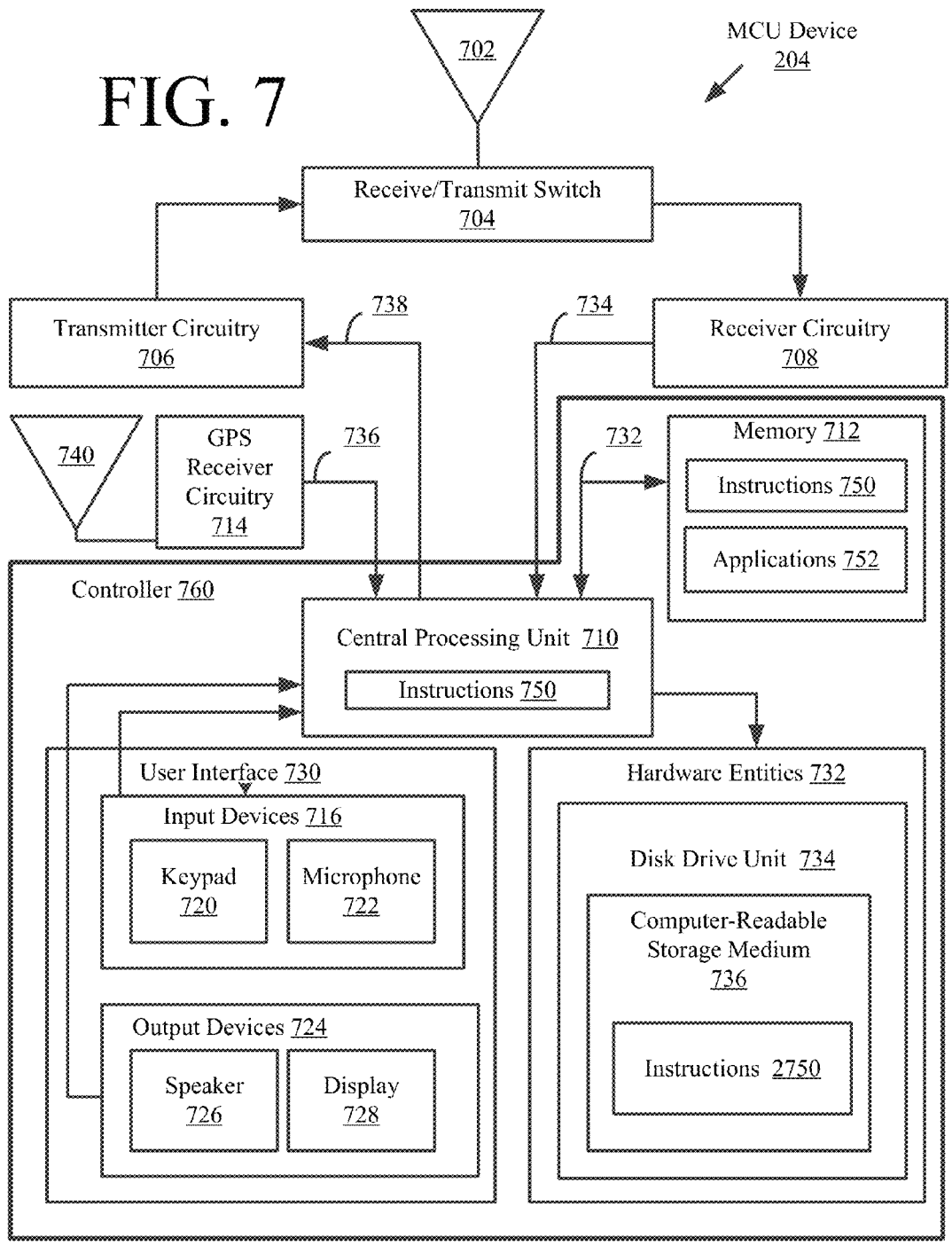
FIG. 7 is a detailed block diagram of a mission critical user device shown in FIG. 1 that is useful for understanding the present invention.

Referring now to FIG. 7, there is provided a more detailed block diagram of the MCU device 204 that is useful for understanding the present invention. The MCU devices 206, 208 of FIG. 2 can be the same as or similar to MCU device 204. As such, the following discussion of MCU device 204 is sufficient for understanding MCU devices 206, 208 and of FIG. 2. Notably, some or all the components of the MCU device 204 can be implemented as hardware, software and/or a combination of hardware and software. The hardware includes, but is not limited to, one or more electronic circuits.

MCU device 204 may include more or less components than those shown in FIG. 7. However, the components shown are sufficient to disclose an illustrative embodiment implementing the present invention. The hardware architecture of FIG. 7 represents one embodiment of a representative MCU device configured to facilitate the patching of full duplex calls to half-duplex calls as described herein. As such, MCU device 204 of FIG. 7 implements methods for redirecting CU devices to HAS s in accordance with embodiments of the present invention. Such methods are described above in relation to FIG. 3.

As shown in FIG. 7, the MCU device 204 comprises an antenna 702 for receiving and transmitting communication signals over a telephony communications link and/or a PTT communications link. A receive/transmit (Rx/Tx) switch 704 selectively couples the antenna 702 to the transmitter circuitry 706 and receiver circuitry 708 in a manner familiar to those skilled in the art. Although a single antenna 702 and transceiver 704/706/608 is shown in FIG. 7, the present invention is not limited in this regard. MCU device 204 can alternatively comprise a first antenna and a first transceiver for handling telephony communications, as well as a second antenna and a second transceiver for handling PTT communications.

The receiver circuitry 708 decodes the communication signals received from an external communication device to derive information therefrom. The receiver circuitry 708 is coupled to a controller 760 via an electrical connection 734. The receiver circuitry 708 provides decoded communication signal information to the controller 760. The controller 760 uses the decoded communication signal information in accordance with the function(s) of the MCU device 204. The controller 760 also provides information to the transmitter circuitry 706 for encoding information and/or modulating information into communication signals. Accordingly, the controller 760 is coupled to the transmitter circuitry 706 via an electrical connection 738. The transmitter circuitry 706 communicates the communication signals to the antenna 702 for transmission to an external device.

An antenna 740 is coupled to Global Positioning System ("GPS") receiver circuitry 714 for receiving GPS signals. The GPS receiver circuitry 714 demodulates and decodes the GPS signals to extract GPS location information therefrom. The GPS location information indicates the location of the MCU device 204. The GPS receiver circuitry 714 provides the decoded GPS location information to the controller 760. As such, the GPS receiver circuitry 714 is coupled to the controller 760 via an electrical connection 736. Notably, the present invention is not limited to GPS based methods for determining a location of the MCU device 204. Other methods for determining a location of a communication device can be used with the present invention without limitation. The controller 760 uses the decoded GPS location information in accordance with the function(s) of the MCU device 204. For example, the GPS location information and/or other location information can be used to generate a geographic map showing the location of the MCU device 204.

The controller 760 stores the decoded signal information and the decoded GPS location information in its internal memory 712. Accordingly, the controller 760 comprises a Central Processing Unit ("CPU") 710 that is connected to and able to access the memory 712 through an electrical connection 732. The memory 712 can be a volatile memory and/or a non-volatile memory. For example, the memory 712 can include, but is not limited to, a Random Access Memory (RAM), a Dynamic Random Access Memory (DRAM), a Static Random Access Memory (SRAM), Read-Only Memory (ROM) and flash memory. The memory 712 can also have stored therein software applications 752 and/or instructions 750. The software applications 752 include, but are not limited to, applications operative to: facilitate telephony calls with other telephony enabled devices (e.g., CU device 214 and telephony ASs 110, 212 of FIG. 2); facilitate PTT calls with other PTT enabled devices (e.g., MCU devices 206, 208 and PTT AS 216 of FIG. 2); and/or facilitate the performance of a user initiated call transfer process in accordance with the present invention. An exemplary user-initiated call transfer process is described above in relation to FIG. 3.

At least some of the hardware entities 732 perform actions involving access to and use of memory 712. In this regard, hardware entities 732 may include microprocessors, Application Specific Integrated Circuits ("ASICs") and other hardware. Hardware entities 732 may include a microprocessor programmed for facilitating: telephony calls with other telephony enabled devices (e.g., CU device 214 and telephony ASs 110, 212 of FIG. 2); PTT calls with other PTT enabled devices (e.g., MCU devices 206, 208 and PTT AS 216 of FIG. 2); and/or the performance of a user initiated call transfer process in accordance with the present invention. In this regard, it should be understood that the microprocessor can access and run applications 752 installed on the MCU device 204.

As shown in FIG. 7, the hardware entities 732 can include a disk drive unit 734 comprising a computer-readable storage medium 736 on which is stored one or more sets of instructions 750 (e.g., software code) configured to implement one or more of the methodologies, procedures, or functions described herein. The instructions 750 can also reside, completely or at least partially, within the memory 712 and/or within the CPU 710 during execution thereof by the MCU device 204. The memory 712 and the CPU 710 also can constitute machine-readable media. The term "machine-readable media", as used here, refers to a single medium or multiple media (e.g., a centralized or distributed database, and/or associated caches and servers) that store the one or more sets of instructions 750. The term "machine-readable media", as used here, also refers to any medium that is capable of storing, encoding or carrying a set of instructions 750 for execution by the MCU device 204 and that cause the MCU device 204 to perform any one or more of the methodologies of the present disclosure.

The user interface 730 comprises input devices 716 and output devices 724. The input devices 716 include, but are not limited to, a keypad 720, a microphone 722, and buttons (not shown). The buttons can enable a user-software interaction to initiate a call redirecting process for patching a full duplex call into a half-duplex call, as described above in relation to FIG. 3.

The output devices 724 include, but are not limited to, a speaker 726 and a display 728. During operation, one or more GUIs may be presented to the user of the MCU device 204 via the display 728. For example, a GUI may be displayed on display 728 for enabling a user-software interaction to initiate a call redirecting process for patching a full duplex call into a half-duplex call, as described above in relation to FIG. 3.

Figure 8:
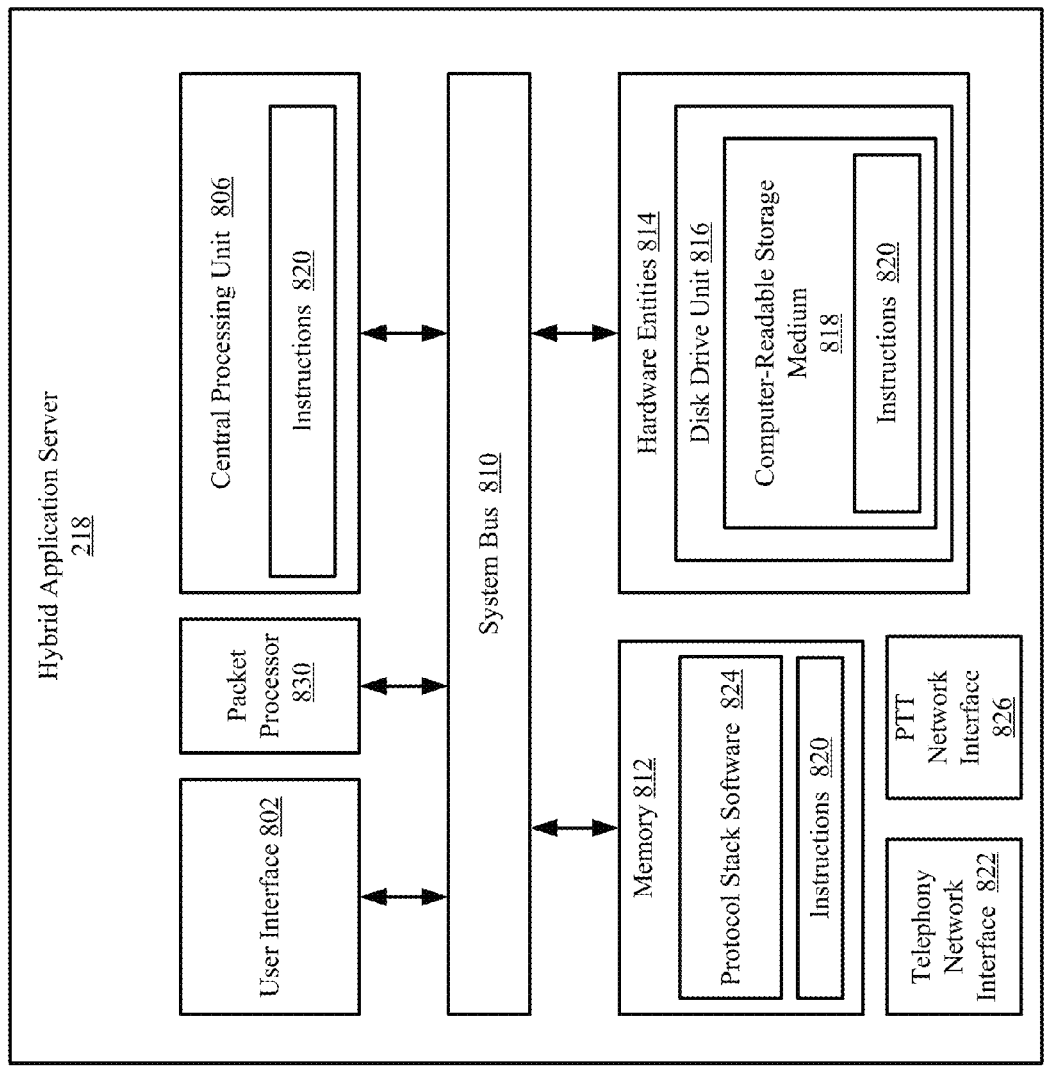
FIG. 8 is a detailed block diagram of a hybrid application server shown in FIG. 1 that is useful for understanding the present invention.

Referring now to FIG. 8, there is provided a more detailed block diagram of the HAS 218 that is useful for understanding the present invention. HAS 218 may include more or less components than those shown in FIG. 8. However, the components shown are sufficient to disclose an illustrative embodiment implementing the present invention. The hardware architecture of FIG. 8 represents one embodiment of a representative computing device configured to facilitate patching full duplex calls into half-duplex calls in accordance with the present invention. As such, the HAS 218 of FIG. 8 implements methods for call patching in accordance with embodiments of the present invention. Such methods are described above in relation to FIG. 4.

As shown in FIG. 8, HAS 218 includes system interfaces 822, 826, a user interface 802, a packet processor 830, a CPU 806, a system bus 810, a memory 812 connected to and accessible by other portions of HAS 218 through system bus 810, and hardware entities 814 connected to system bus 810. At least some of the hardware entities 814 perform actions involving access to and use of memory 812. The memory 812 can be volatile memory and/or non-volatile memory. For example, the memory 812 can include, but is not limited to, a Random Access Memory ("RAM"), a Dynamic Random Access Memory ("DRAM"), a Static Random Access Memory ("SRAM"), a Read Only Memory ("ROM"), a flash memory, a disk driver and/or a Compact Disc Read Only Memory ("CD-ROM"). The memory 812 can also have stored therein protocol stack software 824 and instructions 820.

The protocol stack software 824 implements the protocols of a protocol stack employed by a telephony network and the protocols of a protocol stack employed by a PTT network. Telephony network protocol stacks and PTT network protocol stacks are well known in the art, and therefore will not be described herein. Still, it should be understood that the telephony network protocol stack can include, but is not limited to, a VoIP protocol stack. The PTT protocol stack can be SIP based protocol stack.

The protocol stack software 824 is also configured to process packets which are in a telephony protocol stack format and packets which are in a PTT protocol stack format. More particularly, the protocol stack software 824 is operative to generate: a PTT packet by converting the telephony protocol format of a packet received from a telephony enabled device (e.g., CU device 214 of FIG. 2) into a PTT protocol format; and a telephony packet by converting the PTT protocol format of a packet received from a PTT enabled device (e.g., MCU device 202, 206, 208 of FIG. 2) into a telephony protocol format. The protocol stack software 824 is also operative to facilitate: the communication of the PTT packet to PTT enabled devices (e.g., MCU device 202, 206, 208 of FIG. 2) of a corresponding talkgroup (e.g., talkgroup 202 of FIG. 2); and the communication of the telephony packet to a telephony enabled device (e.g., CU device 214 of FIG. 2).

As also shown in FIG. 8, HAS 218 comprises a telephony system interface 822 which allows the HAS 218 to communicate directly or indirectly with external telephony enabled devices (e.g., CU device 214 and telephony AS 212 of FIG. 2). HAS 218 also comprises a PTT network interface 826 which allows the HAS 218 to communicate directly or indirectly with external PTT enabled devices (e.g., MCU device 202, 206, 208 and PTT AS 216 of FIG. 2).

Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by HAS 218. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the HAS 218 and that cause HAS 218 to perform any one or more of the methodologies of the present disclosure.

In some embodiments of the present invention, the hardware entities 814 include an electronic circuit (e.g., a processor) programmed for enabling the call patching technology described herein. In this regard, it should be understood that the electronic circuit can implement the protocols of a telephony network and a PTT network employed by HAS 218. Accordingly, the electronic circuit can be configured to perform at least a portion of one or more of the methods described above in relation to FIGS. 3-4.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for a full-duplex call transfer into a half-duplex call, comprising:
    establishing said first full-duplex call between a first communication device and a second communication device already engaged in said half-duplex call with at least one third communication device;
    communicating a REFER request message from the second communication device to the first communication device as part of a full-duplex call transmission over a full-duplex call infrastructure, said REFER request message including contact information for redirecting the first communication device to a hybrid application server and token information that is to be subsequently used to patch the full-duplex call into the half-duplex call without modification thereof;
    in response to the REFER request message, performing operations by the first communication device to re-direct a full-duplex call to the hybrid application server, said operations comprising
        (1) terminating the first full-duplex call, and
        (2) establishing a second full-duplex call with the hybrid application server by using an INVITE message including the token information contained in the REFER request message without modification; and
    performing operations by the hybrid application server to patch the second full-duplex call into the half-duplex call using said token information contained in the INVITE message.

2. The method according to claim 1, wherein the REFER request message comprises a Refer-to header field comprising the contact information and a Refer-to token field comprising the token information.

3. The method according to claim 1, wherein the token information comprises at least one of an identifier of the second communication device, authentication information for a user of the second communication device, a time stamp indicating a time the call transfer began, a location of the hybrid application server on a half-duplex network, and a talkgroup identifier.

4. The method according to claim 1, wherein the token information is at least one of encrypted and digitally signed.

5. The method according to claim 1, further comprising performing operations by the hybrid application sever to convert a telephony protocol format of first data received from the first communication device to a PTT protocol format.

6. The method according to claim 5, further comprising communicating the first data in the PTT protocol format from the hybrid application server to the second communication device.

7. The method according to claim 1, further comprising performing operations by the hybrid application sever to convert a PTT protocol format of first data received from the second communication device to a telephony protocol format.

8. The method according to claim 7, further comprising communicating the first data in the telephony protocol format to the first communication device.

9. The method according to claim 1, wherein the REFER request message is generated by the second communication device in response to user instructions to initiate an Explicit Communications Transfer supplementary service, while the second communication device is engaged in the full-duplex call and the half-duplex call.

10. A system, comprising:
    a first communication device configured to
        establish a first full-duplex call with a second communication device while engaged in a half-duplex call with at least one third communication device, and
        communicate a REFER request message to the second communication device as part of a full-duplex call transmission over a full-duplex call infrastructure, said REFER request message including contact information for redirecting the second communication device to a hybrid application server and token information that is to be subsequently used to patch the full-duplex call into the half-duplex call without modification thereof;
    said second communication device configured to perform operations to re-direct the full-duplex call to the hybrid application server in response to the REFER request message, said operations comprising
        terminating the first full-duplex call, and
        establishing a second full-duplex call with the hybrid application server by using an INVITE message including the token information contained in the REFER request message without modification; and
    said hybrid application server configured to patch the second full-duplex call into the half-duplex call using said token information contained in the INVITE message.

11. The system according to claim 10, wherein the REFER request message comprises a Refer-to header field comprising the contact information and a Refer-to token field comprising the token information.

12. The system according to claim 10, wherein the token information comprises at least one of an identifier of the first communication device, authentication information for a user of the first communication device, a time stamp indicating a time the call transfer began, a location of the hybrid application server on a half-duplex network, and a talkgroup identifier.

13. The system according to claim 10, wherein the token information is at least one of encrypted and digitally signed.

14. The system according to claim 10, wherein the hybrid application server is further configured to convert a telephony protocol format of first data received from the second communication device to a PTT protocol format.

15. The system according to claim 14, wherein the first data in the PTT protocol format is communicated from the hybrid application server to the first communication device.

16. The system according to claim 10, wherein the hybrid application server is configured to convert a PTT protocol format of first data received from the first communication device to a telephony protocol format.

17. The system according to claim 16, wherein the first data in the telephony protocol format is communicated from the hybrid application server to the second communication device.

18. The system according to claim 10, wherein the REFER request message is generated by the first communication device in response to user instructions to initiate an Explicit Communications Transfer supplementary service, while the first communication device is engaged in the full-duplex call and the half-duplex call.

19. A hybrid application server, comprising:
at least one electronic circuit configured to
concurrently be engaged in a first full-duplex call with a first communication device and a half duplex call with a second communication device, where the first full-duplex call is established with the first communication device using an INVITE message including token information contained in a REFER request message without modification, said REFER request message previously communicated as part of a full-duplex call transmission over a full-duplex call infrastructure; and
patch the first full-duplex call into the half-duplex call using token information contained in the INVITE message received from the first communication device during call transfer operations of an Explicit Communication Transfer supplementary service.

20. The hybrid application server according to claim 19, wherein the call transfer operations comprise Session Initiation Protocol REFER operations.

21. The hybrid application server according to claim 19, wherein the token information comprises at least one of an identifier of the second communication device, authentication information for a user of the second communication device, a time stamp indicating a time the call transfer began, a location of the hybrid application server on a half-duplex network, and a talkgroup identifier.

22. The hybrid application server according to claim 19, wherein the token information is at least one encrypted and digitally signed.

23. The hybrid application server according to claim 19, wherein the token information comprises information contained in a Refer-to token field of a REFER request message.

24. The hybrid application server according to claim 19, wherein the electronic circuit is further configured to convert a telephony protocol format of first data received from the first communication device to a PTT protocol format.

25. The hybrid application server according to claim 24, wherein the electronic circuit is further configured to communicate the first data in the PTT protocol format to the second communication device.

26. The hybrid application server according to claim 19, wherein the electronic circuit is further configured to convert a PTT protocol format of first data received from the second communication device to a telephony protocol format.

27. The hybrid application server according to claim 26, wherein the electronic circuit is further configured to communicate the first data in the telephony protocol format to the first communication device.

28. A method for a full-duplex call transfer into a half-duplex call, comprising:
performing first operations by a hybrid application server to engage in a first full-duplex call with a first communication device and a half duplex call with a second communication device, where the first full-duplex call is established with the first communication device using an INVITE message including token information contained in a REFER request message without modification, said REFER request message previously communicated as part of a full-duplex call transmission over a full-duplex call infrastructure; and
performing second operations by the hybrid application server to patch the first full-duplex call into the half-duplex call using token information contained in the INVITE message received from the first communication device during call transfer operations of an Explicit Communication Transfer supplementary service.

29. The method according to claim 28, wherein the call transfer operations comprise Session Initiation Protocol REFER operations.

30. The method according to claim 28, wherein the token information comprises at least one of an identifier of the second communication device, authentication information for a user of the second communication device, a time stamp indicating a time the call transfer began, a location of the hybrid application server on a half-duplex network, and a talkgroup identifier.

31. The method according to claim 28, wherein the token information is at least one of encrypted and digitally signed.

32. The method according to claim 28, wherein the token information comprises information contained in a Refer-to token field of a REFER request message.

33. The method according to claim 28, wherein the second operations further comprise converting a telephony protocol format of first data received from the first communication device to a PTT protocol format.

34. The method according to claim 33, wherein the second operations further comprise communicating the first data in the PTT protocol format to the second communication device.

35. The method according to claim 28, wherein the second operations further comprise converting a PTT protocol format of first data received from the second communication device to a telephony protocol format.

36. The method according to claim 35, wherein the second operations further comprise communicating the first data in the telephony protocol format to the first communication device.

* * * * *